US011845470B2

(12) United States Patent
Golov (10) Patent No.: US 11,845,470 B2
(45) Date of Patent: Dec. 19, 2023

(54) DYNAMIC ADAPTATION OF AUTOMOTIVE AI PROCESSING POWER AND ACTIVE SENSOR DATA

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 289 days.

(21) Appl. No.: 16/942,529

(22) Filed: Jul. 29, 2020

(65) Prior Publication Data

US 2022/0032967 A1     Feb. 3, 2022

(51) Int. Cl.
| | |
|---|---|
| *B60W 60/00* | (2020.01) |
| *B60L 58/10* | (2019.01) |
| *H04W 4/48* | (2018.01) |
| *G06N 3/02* | (2006.01) |

(52) U.S. Cl.
CPC ....... *B60W 60/00259* (2020.02); *B60L 58/10* (2019.02); *G06N 3/02* (2013.01); *H04W 4/48* (2018.02); *B60L 2260/46* (2013.01); *B60W 2540/041* (2020.02); *B60W 2556/55* (2020.02)

(58) Field of Classification Search
CPC ..... B60W 60/00259; B60W 2540/041; B60W 2556/55; H04W 4/48; B60L 58/10; B60L 2260/46; G06N 3/02
See application file for complete search history.

(56) References Cited

U.S. PATENT DOCUMENTS

| | | | | |
|---|---|---|---|---|
| 2014/0124647 | A1* | 5/2014 | Hsu ....................... | G06F 1/3262 |
| | | | | 250/208.2 |
| 2015/0375756 | A1* | 12/2015 | Do ....................... | G07C 5/0808 |
| | | | | 701/1 |
| 2016/0173752 | A1* | 6/2016 | Caviedes ........... | H04N 1/00204 |
| | | | | 348/207.11 |
| 2018/0122235 | A1* | 5/2018 | Hanks .................. | G08G 1/0112 |
| 2019/0080602 | A1* | 3/2019 | Rice .................... | B60H 1/00878 |
| 2020/0014884 | A1* | 1/2020 | Koravadi ............. | H04B 7/0617 |
| 2020/0283022 | A1* | 9/2020 | Hara .................. | B60W 60/0025 |
| 2021/0334565 | A1* | 10/2021 | Roche ................... | B60K 37/06 |
| 2021/0402942 | A1* | 12/2021 | Torabi ................. | G06N 3/0454 |

FOREIGN PATENT DOCUMENTS

WO     WO-2014095376 A1 *   6/2014   ............. G01P 3/487

OTHER PUBLICATIONS

WO-2014095376-A1 translation (Year: 2014).*

* cited by examiner

*Primary Examiner* — Mahmoud S Ismail
*Assistant Examiner* — Gabriel Anfinrud
(74) *Attorney, Agent, or Firm* — Greenberg Traurig (57) ABSTRACT

Systems, methods, and apparatus related to dynamically adjusting sensing and/or processing resources of a vehicle. In one approach, sensor data is collected by sensing devices of the vehicle. A controller of the vehicle uses the sensor data to control one or more functions of the vehicle. The controller evaluates the sensor data to determine a context of operation (e.g., weather, lighting, and/or traffic) for the vehicle. Based on the context of operation, the controller adjusts the operation of one or more of the sensing or processing devices in real-time during operation of the vehicle. In one example, the adjustment reduces power consumption by the vehicle.

17 Claims, 6 Drawing Sheets

DYNAMIC ADAPTATION OF AUTOMOTIVE AI PROCESSING POWER AND ACTIVE SENSOR DATA

FIELD OF THE TECHNOLOGY

At least some embodiments disclosed herein relate to electronic systems for vehicles in general, and more particularly, but not limited to dynamically adjusting sensing and/or processing resources of a vehicle based on an evaluation of sensor data.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

Autonomous driving and/or an advanced driver assistance system (ADAS) can use an artificial neural network (ANN) for the identification of events and/or objects that are captured in sensor inputs. Examples of sensor inputs include images from digital cameras, lidars, radars, ultrasound sonars, etc.

In general, an artificial neural network (ANN) uses a network of neurons to process inputs to the network and to generate outputs from the network. For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions. The relations between the input(s) and the output(s) of an ANN in general are defined by an ANN model that includes the data representing the connectivity of the neurons in the network, as well as the bias, activation function, and synaptic weights of each neuron.

For example, the inputs to an ANN network may be generated based on camera inputs; and the outputs from the ANN network may be the identification of an item, such as an event or an object.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for dynamically adjusting sensing and/or processing resources of a vehicle based on an evaluation of sensor data. The vehicle may be, for example, an electric vehicle, an autonomous vehicle, a car, a truck, a plane, a drone, a boat, etc. For example, the vehicle may collect the sensor data using various sensors of the vehicle. The sensor data may be stored in a memory device for use by a controller of the vehicle (e.g., a computing device of an autonomous vehicle that controls vehicle operations by accessing sensor data stored in the memory device). In one example, the memory device is a solid-state drive mounted in an electric vehicle.

Modern vehicles, including autonomous vehicles, contain numerous sensing devices (e.g., lidar, radar) and processing devices (e.g., CPUs, GPUs, FGPAs). In some vehicles, most or all the sensing devices and processing devices run at full performance levels (e.g., at full power or processing speed) while the vehicle is in operation. Running all the sensing devices and processing devices at full performance levels can reduce vehicle efficiency, and for electric vehicles may reduce vehicle range. Running at full performance levels can also cause excessive power consumption (e.g., this consumption may reduce battery life).

Various embodiments of the present disclosure provide a technological solution to one or more of the above technical problems. In one embodiment, operation of one or more sensing devices and/or processing devices is adjusted based on a context of operation of a vehicle. For example, when the vehicle is operating on an open highway with few objects to detect, operation of some sensing devices or processing devices may be adjusted (e.g., turned off or operated at reduced performance). When the vehicle is operating in a congested city with many objects to detect, operation of the sensing devices or processing devices may be further adjusted (e.g., turned on or operated at full performance).

In one embodiment, an electronic control unit (ECU) of a vehicle includes: at least one sensing device to generate sensor data; a non-volatile memory device to store the generated sensor data; at least one artificial neural network (ANN) processor to process the sensor data to provide at least one output, where at least one function of a vehicle is controlled based on the at least one output; and at least one memory containing instructions configured to instruct the at least one processing device to: evaluate, based on the stored sensor data, a context of operation of the vehicle; and adjust, based on evaluating the context of operation, at least one operating characteristic for one or more of the at least one sensing device or the at least one ANN processor.

Advantages provided by various embodiments described herein may include, for example, reduced power consumption when full performance of the sensing devices and processing devices is not required, while retaining full performance when required. Reduced power consumption by the sensing devices and/or processing devices may improve vehicle efficiency, and for battery powered vehicles may result in improved vehicle range. Also, hardware reliability can be increased if components don't work at full performance levels at all times.

Figure 1:
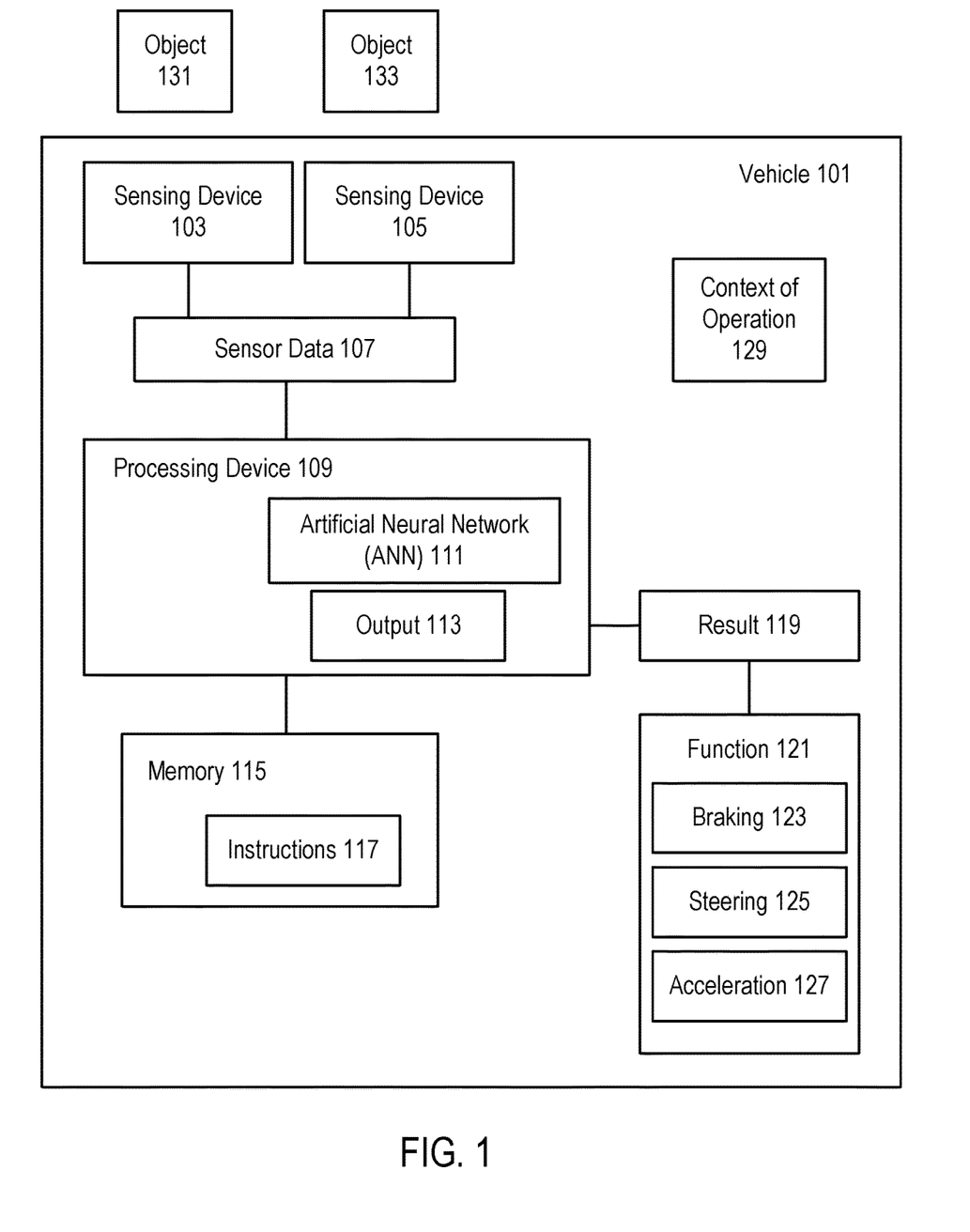
FIG. 1 illustrates a vehicle including one or more sensing devices and one or more processing devices where the operation of the sensing devices and/or processing devices is adjusted based on a context of operation of the vehicle, in accordance with some embodiments.

FIG. 1 illustrates a vehicle (e.g., vehicle 101) including one or more sensing devices 103, 105 and one or more processing devices 109 where the operation of the sensing devices and/or processing devices is adjusted based on a context of operation of vehicle 101, in accordance with some embodiments.

In one embodiment, sensor data (e.g., sensor data 107) is evaluated by an artificial neural network (ANN) (e.g., ANN 111) to identify a result (e.g., result 119), and result 119 is used to control at least one function (e.g., function 121) of vehicle 101. A context of operation (e.g., context of operation 129) of vehicle 101 is evaluated based on sensor data 107. Based on context of operation 129, the operation of sensing devices 103, 105 and/or the operation of processing device 109 is adjusted (e.g., changing a sensing device from an active state to an inactive state, operating a sensing device at a lower frame rate, or operating a processing device at a lower frequency, etc.).

In one embodiment, vehicle 101 may be an autonomous vehicle, an electric vehicle, a gasoline or diesel-powered vehicle, a drone, or other vehicle. Vehicle 101 may be a land-operated vehicle, watercraft, aircraft, or other type of vehicle.

Sensing devices 103, 105 may be, for example, an image sensor, camera, video camera, motion sensor, vibration sensor, force/stress sensor, deformation sensor, proximity sensor, temperature sensor, GPS (Global Positioning System) receiver, lidar, radar, brake sensor, speed sensor, accelerometer, airbag sensor, audio sensor/microphone, ultrasound sonar, or other type of sensor. Some sensing devices can be configured primarily to monitor the environment of vehicle 101 for driving decisions and/or assistances; and other sensing devices can be configured primarily to monitor the operating and/or health conditions of one or more component of vehicle 101, such as an internal combustion engine, exhaust system, electric motor, brake, tire, battery, etc.

In one example, sensing devices 103, 105 output collected sensor data 107. Sensor data 107 may include, for example, still pictures, streaming video, lidar images, radar images, GPS position, sound recordings, acceleration data, vibration data, etc. Sensor data 107 may be output as streaming data, and/or as discrete packets of data.

In one example, sensor data 107 is processed by processing device 109. Processing device 109 may be, for example, a microprocessor, microcontroller, graphics processor, embedded processor, embedded controller, central processing unit (CPU), processing core, execution unit, system on a chip (SOC), application specific integrated circuit (ASIC), field programmable gate array (FPGA), neural network accelerator, or other processing device. Processing device 109 may be implemented using a single processor with a single processing core, a single processor with multiple processing cores, or multiple processors. In some instances, processing device 109 includes multiple processing cores, with each processing core having its own in-processor cache memory.

In one example, processing device 109 is coupled to memory (e.g., memory 115). Memory 115 can include volatile memory (e.g., DRAM and/or SRAM) and/or non-volatile memory. Memory 115 may be separate from processing device 109 (e.g., DIMM or SIMM modules) or may be embedded within the processing device 109 (e.g., HBM). In one example, processing device 109 and memory 115 are configured on a printed circuit board. In some instances, processing device 109 and memory 115 are packaged together in a System on Chip (SoC).

Examples of non-volatile memory include flash memory, memory units formed based on Negative-AND (NAND) logic gates, Negative-OR (NOR) logic gates, Phase-Change Memory (PCM), magnetic memory (MRAM), Resistive Random-Access Memory (RRAM), cross point memory and other memory devices. A cross point memory device can use transistor-less memory elements, each of which has a memory cell and a selector that are stacked together as a column. Memory element columns are connected via two lays of wires running in perpendicular directions, where wires of one lay run in one direction in the layer located above the memory element columns, and wires of the other lay is in another direction and in the layer located below the memory element columns. Each memory element can be individually selected at a cross point of one wire on each of the two layers. Cross point memory devices are fast and non-volatile and can be used as a unified memory pool for processing and storage.

Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM), etc. Examples of volatile memory include Dynamic Random-Access Memory (DRAM) and Static Random-Access Memory (SRAM).

In one example, memory 115 contains instructions 117 that instruct processing device 109 to, for example, evaluate a context of operation (e.g., context of operation 129) of vehicle 101, and adjust at least one operating characteristic for one or more sensing devices 103, 105, or processing device 109, based on evaluating the context of operation 129. In one example, instructions 117 instruct processing device 109 to determine, based on sensor data 107, a number of objects 131, 133 to be identified, and evaluating context of operation 129 is based on the number of objects.

In one example, an accident area with debris on the roadway and/or emergency vehicles nearby may require identifying a large number of objects and hazards. In this context of operation 129, vehicle 101 may adjust the operating characteristics of sensing devices 103, 105 and processing device 109 to increase the number of active sensing devices, increase sensing device resolution and/or frames per second, and/or increase processing power.

In one embodiment, processing device 109 contains an artificial neural network (ANN) 111. ANN 111 uses a network of neurons to process inputs to the network and to generate outputs from the network.

For example, each neuron in the network receives a set of inputs. Some of the inputs to a neuron may be the external inputs provided into the neural network, and some of the inputs to a neuron may be the outputs of certain neurons in the network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron. Input to ANN 111 can be described as an input vector, and the output can be described as an output vector.

The relations between the input(s) and the output(s) of an ANN in general are defined by a neuron model that includes the data representing the connectivity of the neurons in the ANN, as well as the bias, activation function, and synaptic weights of each neuron. Using a given neuron model, processing device 109 computes an output (e.g., output 113) of ANN 111 from a given set of input data.

In one embodiment, ANN 111 is a spiking neural network (SNN). An SNN is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before spiking, the activation level of the SNN neuron can decay over time, as controlled by the differential equation. The element of time in the behavior of SNN neurons makes an SNN suitable for processing spatiotemporal data. The connectivity of an SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning and learning with error correction.

Alternatively, or in combination, an ANN may be trained using an unsupervised method where the exact outputs resulting from a given set of inputs are not known before the completion of the training. The ANN can be trained to classify an item into a plurality of categories, or data points into clusters. Multiple training algorithms can be employed for a sophisticated machine learning/training paradigm.

In one example, ANN 111 is trained to generate output 113 from provided inputs (e.g., sensor data 107). For example, sensor data 107 may be video images from sensing device 103 (e.g., a camera). Output 113 from ANN 111 may be the identification of an item, such as an object (e.g., object 131, 133) or an event.

Object 131, 133, may be, for example, a traffic object (e.g., vehicle, bicycle, pedestrian, debris in the road, etc.), an infrastructure traffic constraint (e.g., traffic signal, road sign, etc.), road structure (e.g., road, median barrier, guard rail, etc.), or path structure (e.g., bicycle path, animal crossing, etc.).

In one example, output 113 identifies events. Events may include, for example, a stoplight turning red, a vehicle braking in front of vehicle 101, a pedestrian or animal crossing the road, a tree branch falling onto the road, a change in weather conditions, etc.

In one example, processing device 109 produces result 119 based on output 113. In one example, result 119 controls at least one function 121 of vehicle 101. For example, output 113 may identify object 131 as a pedestrian and generate result 119 controlling function 121 of vehicle 101 (e.g., braking 123, or steering 125). In one example, output 113 is an event (e.g., a traffic light turning green). Result 119 may be a command (e.g., acceleration 127) to function 121.

In one embodiment, ANN 111 evaluates the context of operation 129 of vehicle 101 based on sensor data 107. For example, sensor data 107 may be video images from sensing device 103 (e.g., a camera or lidar sensing device). Based on the sensor data 107, ANN 111 may generate output 113 identifying context of operation 129 of vehicle 101 as being, for example, a type of weather (e.g., day time, night time, sunny, raining, foggy, snowing, etc.), a geographic location or heading (e.g., GPS position, direction of travel, velocity, etc.), and/or traffic conditions (e.g., city driving in congested traffic, rural highway with little traffic, road construction, etc.).

In one embodiment, vehicle 101 evaluates context of operation 129 based on information received from a central control station (e.g., a central server operating in a cloud network). For example, the central control station may use geofencing and GPS location of vehicle 101 to inform vehicle 101 that the vehicle has moved from a city location to a rural location.

In one example, adjusting at least one operating characteristic of one or more processing devices 109 includes reducing a processing power of processing device 109. In one example, reducing the processing power of processing device 109 includes at least one of reducing a clock frequency (e.g., reducing processing device 109 clock frequency from 2 GHz to 500 MHz), or reducing a number of active cores (e.g., reducing active cores from eight active cores to four active cores).

In one example, adjusting at least one operating characteristic based on evaluating the context of operation 129 includes adjusting at least one characteristic of memory 115 (e.g., reducing the operating voltage and/or frequency of memory 115).

In one example, adjusting at least one operating characteristic includes adjusting at least one of a number of sensing devices that are in an active state, a resolution for one or more sensing devise, and/or a rate at which frames are generated by a sensing device. In one example, sensing device 103 is a lidar sensing device operating at 30 frames per second and five megapixels per frame. Adjusting sensing device 103 may be, for example, changing the frame rate to 15 frames per second and/or the resolution to one megapixel per frame. In one example, sensing device 103 is an active camera, and sensing device 105 is an active radar sensor. Adjusting at least one operating characteristic may include, for example, deactivating the radar sensor.

The performance of different types of sensing devices often varies based on what is being sensed and the conditions in which the sensing device is operating. For example, radar and lidar are very good at identifying cars, trucks and motorcycles and are robust in rain, snow, and darkness.

Lidar is better at identifying pedestrians, animals and road debris, but is not as robust in fog. Cameras are better at identifying road markings and traffic signs, but are not as robust in rain, snow, fog and darkness, etc.

In one example, the number of active sensing devices 103, 105 is adjusted based on the type of objects 131, 133 to be detected. For example, a radar or lidar sensor may be activated in response to identifying more vehicles near vehicle 101.

Figure 2:
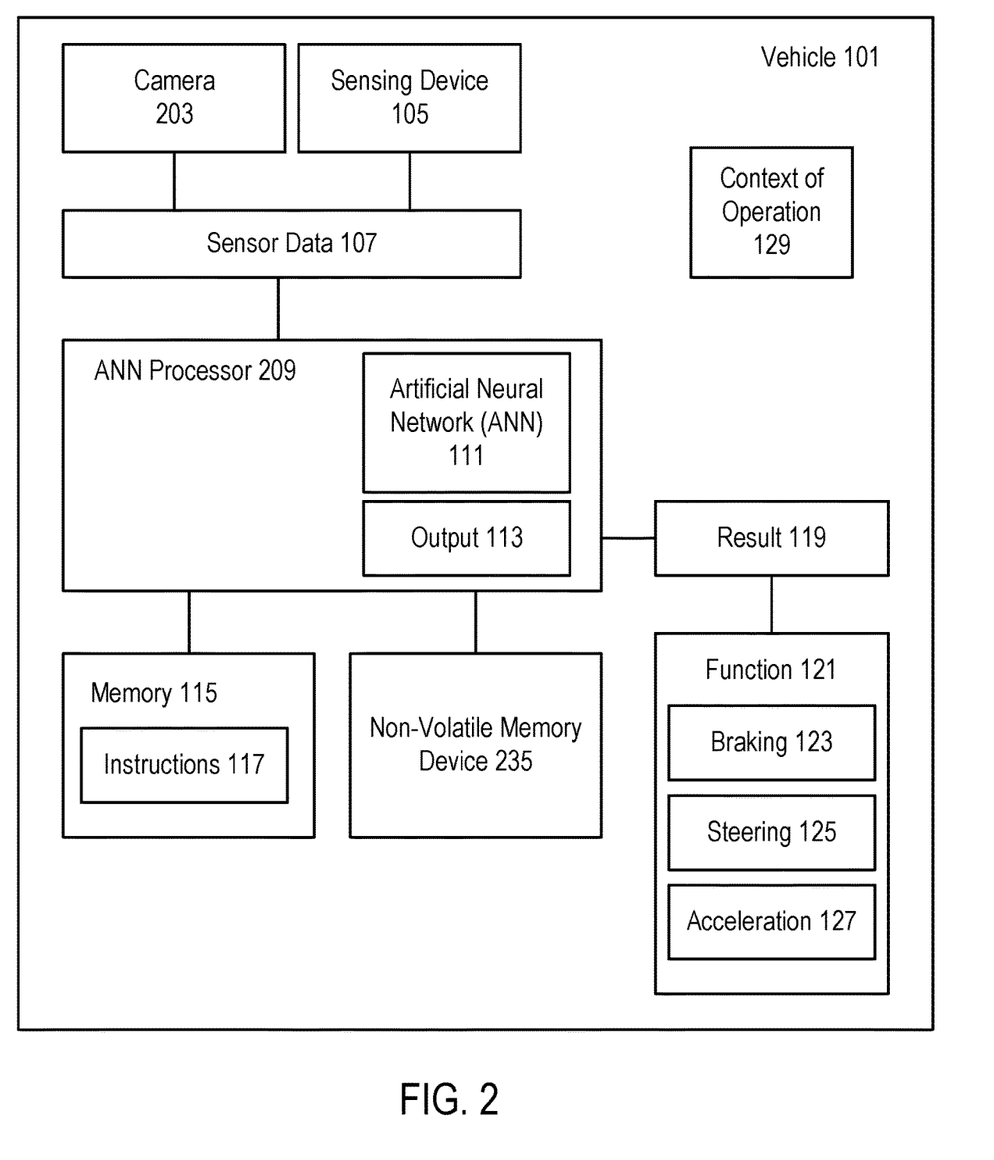
FIG. 2 illustrates a vehicle including one or more sensing devices and one or more artificial neural network (ANN) processors, where the operation of the sensing devices and/or ANN processors is adjusted based on a context of operation of the vehicle, in accordance with some embodiments.

FIG. 2 illustrates a vehicle including one or more sensing devices and one or more artificial neural network (ANN) processors, where the operation of the sensing devices and/or ANN processors is adjusted based on a context of operation of the vehicle, in accordance with some embodiments.

In one embodiment, vehicle 101 includes camera 203. In one example, camera 203 of FIG. 2 is sensing device 103 of FIG. 1. Camera 203 may be, for example, a digital camera, video camera, dashcam, omnidirectional camera, onboard camera, infrared camera, rangefinder camera, ultrasonic camera, image sensor, etc.

In one example, sensor data 107 from camera 203 is processed by an artificial neural network (ANN) processor (e.g., ANN processor 209). In one example, ANN processor 209 of FIG. 2 is implemented using processing device 109 of FIG. 1.

In one embodiment, ANN processor 209 is implemented using a neural network accelerator. A neural network accelerator can be configured to perform computations, such as matrix arithmetic computations for ANN 111 and/or or differential equation simulations for an SNN, using sensor data 107 from camera 203 and sensing device 105.

Examples of the matrix arithmetic computations include matrix multiplication and accumulation operations. After a computation to generate a result of the matrix arithmetic computations using sensor data 107, ANN processor 209 can provide the result as output 113, or the result of the matrix arithmetic computation can be buffered in ANN processor 209 as an operand for a next matrix computation.

In one embodiment, a portion of ANN processor 209 is implemented in a memristor crossbar array. In general, a memristor is a two-terminal electrical component that has a non-constant electrical resistance. Its resistance can change based on the history of current flowing through the memristor and/or the history of voltage applied on the memristor. In general, a memristor crossbar array is an array of memristors where each memristor is located at the intersection of a wordline and a bitline. A crossbar array of memristors can be configured to perform Multiply-and-Accumulate (MAC) operations via analog circuitry. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations.

In one embodiment, vehicle 101 includes a non-volatile memory device (e.g., non-volatile memory device 235). Non-volatile memory device 235 has memory that can retain data when non-volatile memory device 235 is not powered. Non-volatile memory device 235 may be, for example, a solid-state disk, compact flash module, PCIe card, NVMe module, or other type of non-volatile memory device. Non-volatile memory device 235 may be based on non-volatile memory technologies including, for example, flash memory (e.g., SLC, MLC, TLC, QLC, etc.), memory units formed based on Negative-AND (NAND) logic gates, Negative-OR (NOR) logic gates, Phase-Change Memory (PCM), magnetic memory (MRAM), Resistive Random-Access Memory (RRAM), cross point memory and other memory technologies. In some instances, non-volatile memory device 235 may include both volatile memory (e.g., DRAM, SRAM) and non-volatile memory.

Non-volatile memory device 235 can be packaged in any form factor. For example, non-volatile memory device 235 may be packaged in a small form factor (SFF) disk format (e.g., SFF-2.5, SFF-1.8, etc.), M.2 module, mSATA module, slimSATA module, flash memory card, embedded USB card, BGA module, or other form-factor.

Non-volatile memory device 235 may interface to ANN processor 209 through, for example, an interface compatible with PCIe, NVMe, SATA, SAS, USB, or other interface protocol.

In one example, non-volatile memory device 235 stores sensor data 107 (e.g., data from camera 203) and ANN processor 209 processes sensor data 107 to provide output 113, where at least one function 121 of vehicle 101 is controlled based on output 113. In one example, instructions 117 in memory 115 instruct ANN processor 209 to evaluate context of operation 129 of vehicle 101 based on sensor data 107 stored in non-volatile memory device 235, and adjust at least one operating characteristic for one or more sensing devices 203, 105 or ANN processor 209 based on context of operation 129.

In one example, adjusting the at least one operating characteristic includes adjusting the processing capability of ANN processor 209 (e.g., ANN processor 209 may reduce the number of active cores).

In one example, instructions 117 are configured to instruct ANN processor 209 to determine, based on output 113, a level of activity around vehicle 101, and context of operation 129 is based on the level of activity. In one example, vehicle 101 travels from a congested city to an open highway. ANN processor 209 may determine a lower level of activity on the open highway and determine a new context of operation 129 based on the lower level of activity.

Figure 3:
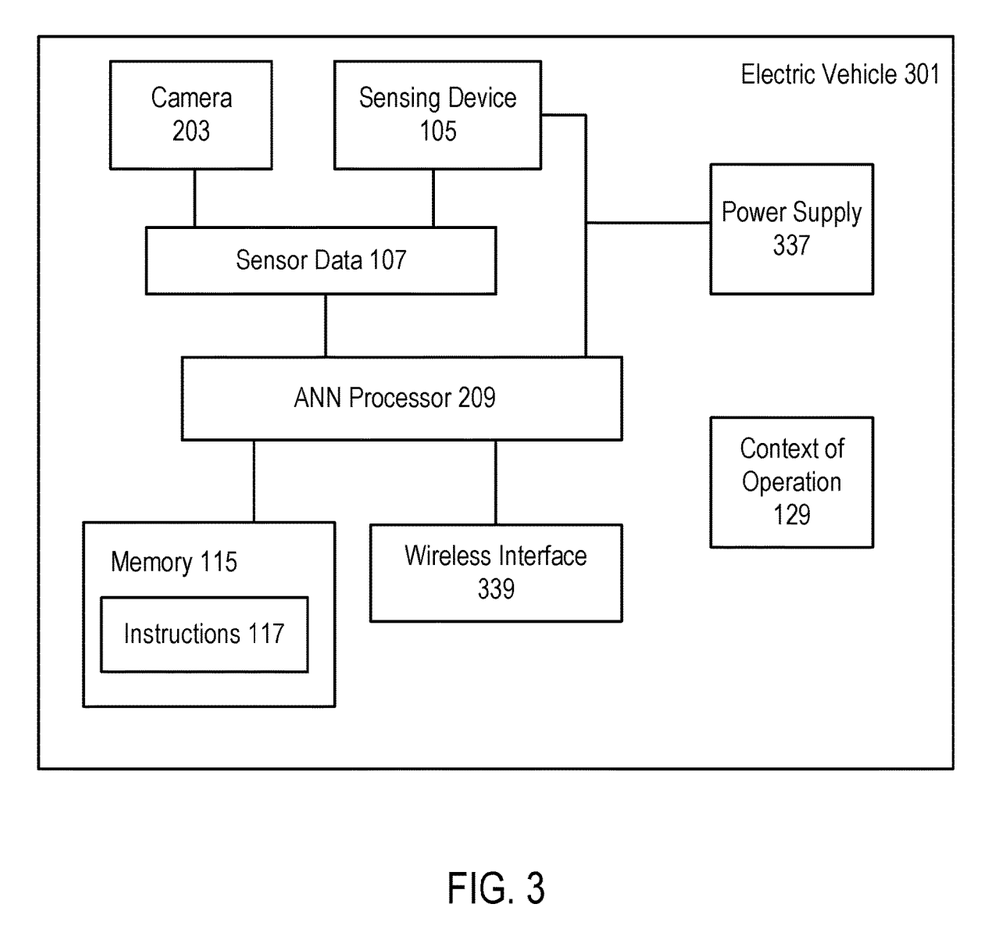
FIG. 3 illustrates an electric vehicle including one or more sensing devices and one or more ANN processors, where the operation of the sensing devices and/or ANN processors is adjusted based on an amount of energy available from a power supply of the vehicle, in accordance with some embodiments.

FIG. 3 illustrates an electric vehicle 301 including one or more sensing devices and one or more ANN processors, where the operation of the sensing devices and/or ANN processors is adjusted based on an amount of energy available from a power supply of the vehicle, in accordance with some embodiments. In one example, electric vehicle 301 of FIG. 3 is implemented as vehicle 101 of FIGS. 1-2. In one example, electric vehicle 301 is an autonomous vehicle.

In one embodiment, electric vehicle 301 includes a power supply (e.g., power supply 337). In one example, power supply 337 is a battery and provides power for at least one motor of electric vehicle 301. Power supply 337 may be, for example, a lead-acid battery, nickel metal hydride battery, lithium-ion battery, aluminum-ion battery, lithium-sulfur battery, metal-air battery, solid state battery, or other power storage device or system.

In one example, power supply 337 provides power to at least one of sensing devices 203, 105 and/or ANN processor 209. In one example, evaluating context of operation 129 includes determining an amount of energy available from power supply 337.

In one embodiment, electric vehicle 301 includes a wireless interface (e.g., wireless interface 339). Wireless interface 339 may be in accordance with a communication protocol including, for example, a mobile wireless network such as 4G or 5G, a local area network (LAN), a wide area network (WAN), an intranet, an extranet, the Internet, vehicle-to-everything (V2X), Bluetooth, and/or any combination thereof.

In one example, instructions 117 cause ANN processor 209 to receive one or more communications on wireless interface 339, and the communications include at least one of cellular or V2X communication. In one example, evaluating context of operation 129 is based at least in part on the received communications. In one example, vehicle 101 receives V2X communication from infrastructure (e.g., a traffic light, and/or other infrastructure components), and context of operation 129 of vehicle 101 includes communication received from the traffic light.

Figure 4:
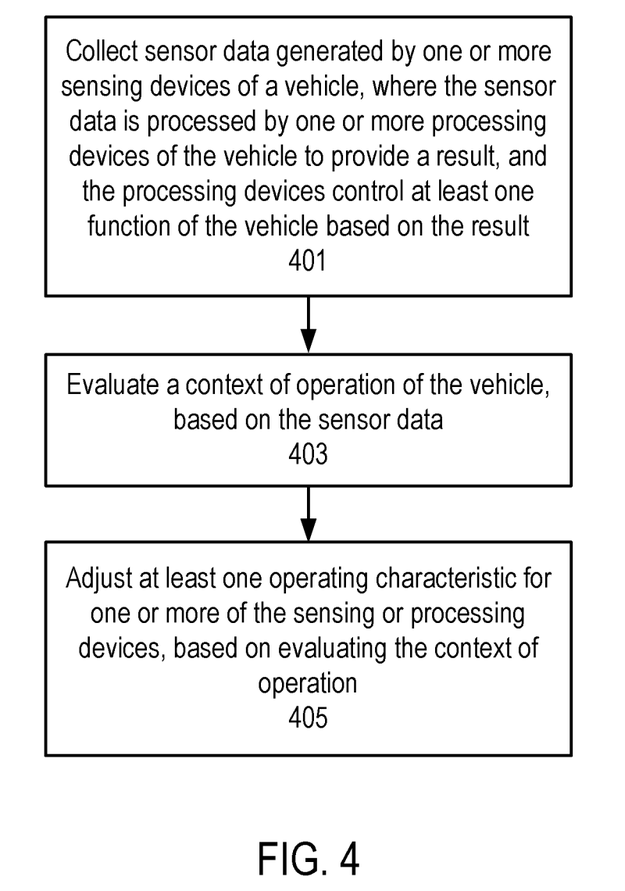
FIG. 4 shows a method for adjusting one or more operating characteristics of sensing devices and/or processing devices of a vehicle based on a context of operation of the vehicle, in accordance with some embodiments.

FIG. 4 shows a method for adjusting one or more operating characteristics of sensing devices (e.g., 103, 105) and/or processing devices (e.g., 109) of a vehicle based on a context of operation (e.g., 129) of the vehicle, in accordance with some embodiments. In one example, the method of FIG. 4 can be implemented in vehicle 101 of FIG. 1.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 109 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, sensor data generated by one or more sensing devices of a vehicle is collected. The sensor data is processed by one or more processing devices of the vehicle to provide a result, and the processing devices control at least one function of the vehicle based on the result. In one example, vehicle 101 is an autonomous vehicle. In one example, sensing device 103 is a radar sensing device and sensing device 105 is a GPS sensing device. In one example, sensor data is sensor data 107.

At block 403, a context of operation of the vehicle is evaluated based on the sensor data. In one example, the context of operation of the vehicle is the GPS location of the vehicle.

At block 405, at least one operating characteristic for one or more of the sensing or processing devices is adjusted, based on evaluating the context of operation. In one example, adjusting at least one operating characteristic includes deactivating one or more sensing devices.

Figure 5:
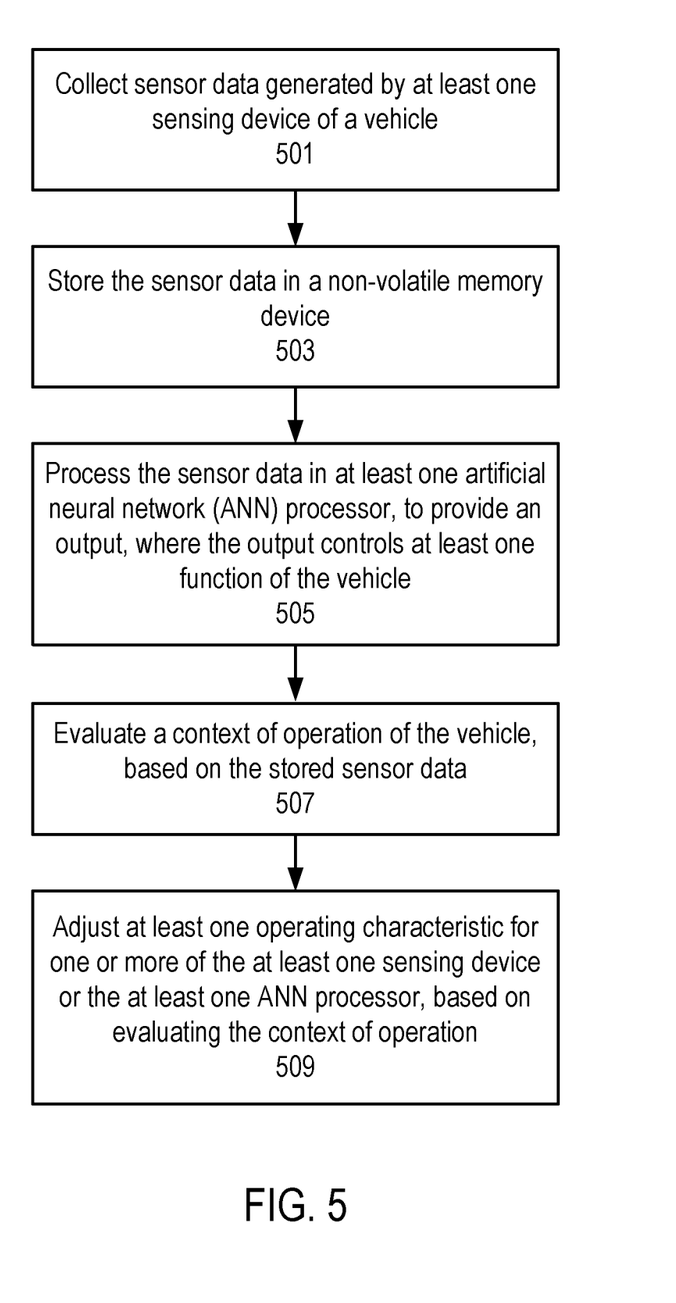
FIG. 5 shows a method for adjusting one or more operating characteristics of sensing devices and/or ANN processors of a vehicle based on a context of operation of the vehicle, in accordance with some embodiments.

FIG. 5 shows a method for adjusting one or more operating characteristics of sensing devices (e.g., 105, 203) and/or ANN processors (e.g., 209) of a vehicle based on a context of operation (e.g., 129) of the vehicle, in accordance with some embodiments. In one example, the method of FIG. 5 can be implemented in vehicle 101 of FIG. 2.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., ANN processor 209 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, sensor data generated by at least one sensing device of a vehicle is collected. In one example, sensor data 107 is a video stream. In one example, sensor data 107 is radar images.

At block 503, the sensor data is stored in a non-volatile memory device. In one example, the non-volatile memory device is non-volatile memory 235. In one example, non-volatile memory 235 is a solid-state drive (SSD).

At block 505, the sensor data is processed in at least one artificial neural network (ANN) processor, to provide an output, where the output controls at least one function of the vehicle. In one example, the output is output 113. In one example, the function of the vehicle is function 121 (e.g., braking 123, steering 125, acceleration 127, etc.).

At block 507, a context of operation of the vehicle is evaluated, based on the stored sensor data. In one example, the stored sensor data is sensor data 107 from camera 203. In one example, context of operation 129 includes determining at least one weather condition.

At block 509, at least one operating characteristic for one or more of the at least one sensing device or the at least one ANN processor is adjusted, based on evaluating the context of operation. In one example, camera 203 resolution may be reduced, and sensing device 105 (e.g., a lidar sensor) may be activated, based on evaluating the context of operation 129.

Figure 6:
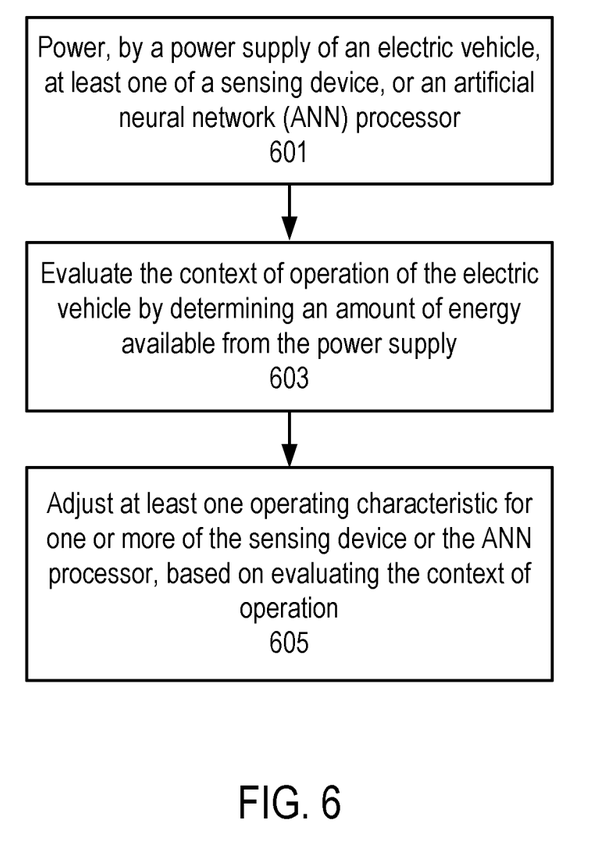
FIG. 6 shows a method for adjusting one or more operating characteristics of sensing devices and/or ANN processors of an electric vehicle based on a context of operation of the vehicle, in accordance with some embodiments.

FIG. 6 shows a method for adjusting one or more operating characteristics of sensing devices and/or ANN processors of an electric vehicle based on a context of operation of the vehicle, in accordance with some embodiments. In one example, the method of FIG. 6 can be implemented in vehicle 301 of FIG. 3.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., ANN processor 209 of FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, at least one of a sensing device, or an artificial neural network (ANN) processor, is powered by a power supply of an electric vehicle. In one example, the power supply is power supply 337. In one example, power supply 337 is a battery.

At block 603, the context of operation of the electric vehicle is evaluated by determining an amount of energy available from the power supply. In one example, the amount of energy available is identified in Watt-hours (Wh).

At block 605, at least one operating characteristic for one or more of the sensing device or the ANN processor is adjusted, based on evaluating the context of operation. In one example, the frequency of ANN processor 209 is reduced based on evaluating the amount of energy available from power supply 337.

In one embodiment, a system includes: at least one sensing device (e.g., sensing device 203, 105) to generate sensor data (e.g., sensor data 107); a non-volatile memory device (e.g., non-volatile memory 235) to store the generated sensor data; at least one artificial neural network (ANN) processor (e.g., ANN processor 209) to process the sensor data to provide at least one output (e.g., output 113), where at least one function (e.g., function 121) of a vehicle (e.g., vehicle 101) is controlled based on the at least one output; and at least one memory (e.g., memory 115) containing instructions (e.g., instructions 117) configured to instruct the at least one processing device to: evaluate, based on the stored sensor data, a context of operation (e.g., context of operation 129) of the vehicle; and adjust, based on evaluating the context of operation, at least one operating characteristic for one or more of the at least one sensing device or the at least one ANN processor.

In one embodiment, adjusting the at least one operating characteristic includes adjusting at least one of a number of sensing devices that are in an active state, a resolution for one or more sensing devices, or a rate at which frames are generated by a sensing device.

In one embodiment, adjusting the at least one operating characteristic includes adjusting a processing capability of the ANN processor.

In one embodiment, the system further includes a power supply (e.g., power supply 337) that provides power to at least one of the sensing device or the ANN processor, where evaluating the context of operation includes determining an amount of energy available from the power supply.

In one embodiment, the vehicle is an electric vehicle (e.g., electric vehicle 301), and the power supply is a battery that provides power for at least one motor of the electric vehicle.

In one embodiment, the instructions are further configured to instruct the at least one processing device to: determine, based on the sensor data, a number of objects (e.g., object 131, 133) to be identified.

In one embodiment, evaluating the context of operation is based on the number of objects.

In one embodiment, the instructions are further configured to instruct the at least one processing device to determine, based on the at least one output of the ANN processor, a level of activity around a vehicle (e.g., presence and/or movement of objects around the vehicle).

In one embodiment, evaluating the context of operation is based on the level of activity.

In one embodiment, a method includes: collecting sensor data generated by one or more sensing devices of a vehicle, where the sensor data is processed by one or more processing devices (e.g., processing device 109) of the vehicle to provide a result (e.g., result 119), and the processing devices control at least one function of the vehicle based on the result (e.g., braking 123, steering 125, acceleration 127, etc.); evaluating, based on the sensor data, a context of operation of the vehicle; and adjusting, based on evaluating the context of operation, at least one operating characteristic for one or more of the sensing or processing devices.

In one embodiment, adjusting the at least one operating characteristic includes changing a state of a sensing device from an active state to an inactive state.

In one embodiment, adjusting the at least one operating characteristic includes reducing a processing power of a processing device.

In one embodiment, reducing the processing power of the processing device includes at least one of reducing a clock frequency, or reducing a number of active cores.

In one embodiment, the vehicle further includes at least one memory device, the method further includes adjusting, based on evaluating the context of operation, at least one operating characteristic of the at least one memory device.

In one embodiment, evaluating the context of operation includes evaluating based on an output from an artificial neural network (ANN) having the sensor data as an input.

In one embodiment, the sensing devices includes at least one camera (e.g., camera 203).

In one embodiment, evaluating the context of operation includes determining at least one weather condition based on image data from the at least one camera.

In one embodiment, evaluating the context of operation includes determining a location of the vehicle.

In one embodiment, a non-transitory computer-readable medium stores instructions which, when executed on a computing device, cause the computing device to: collect sensor data generated by one or more sensing devices of a vehicle, where the sensor data is processed by one or more processing devices of the vehicle to provide a result, and the processing devices control at least one function of the vehicle based on the result; evaluate, based on the sensor data, a context of operation of the vehicle, where evaluating the context of operation includes evaluating based on an output from an artificial neural network (ANN) having the sensor data as an input; and adjust, based on evaluating the context of operation, at least one operating characteristic for one or more of the sensing or processing devices.

In one embodiment, the output includes at least one type of object to be detected.

In one embodiment, adjusting the at least one operating characteristic includes selecting sensing devices to change to an active state based on the at least one type of object to be detected.

In one embodiment, the at least one type of object includes at least one of a traffic object, an infrastructure traffic constraint, a path structure, or a road structure.

In one embodiment, the instructions further cause the computing device to receive one or more communications on a wireless interface (e.g., wireless interface 339) of the vehicle. The communications include at least one of cellular or vehicle-to-everything (V2X) communication. Evaluating the context of operation is further based on the received communications.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a plurality of sensing devices to generate sensor data, wherein the sensing devices include at least one camera;
a non-volatile memory device to store the generated sensor data;
at least one artificial neural network (ANN) processor to process the sensor data to provide at least one output, wherein at least one function of a vehicle is controlled based on the at least one output; and
at least one memory containing instructions configured to instruct the at least one processing device to:
evaluate, based on the stored sensor data, a context of operation of the vehicle, including determining an amount of energy available from a power supply, and further including determining at least one weather condition based on image data from the at least one camera; and
based on evaluating the context of operation of the vehicle: adjust a processing capability of the ANN processor; and
adjust at least one operating characteristic for the sensing devices to reduce power consumption by the vehicle, including reducing a number of the sensing devices that are in an active state.

2. The system of claim 1, wherein adjusting the at least one operating characteristic further includes adjusting a resolution for one or more sensing devices, or a rate at which frames are generated by a sensing device.

3. The system of claim 1, further comprising a power supply that provides power to the sensing devices.

4. The system of claim 3, wherein the vehicle is an electric vehicle, and the power supply is a battery that provides power for at least one motor of the electric vehicle.

5. The system of claim 1, wherein the instructions are further configured to instruct the at least one processing device to:
determine, based on the sensor data, a number of objects to be identified;
wherein evaluating the context of operation is based on the number of objects.

6. The system of claim 1, wherein the instructions are further configured to instruct the at least one processing device to:
determine, based on the at least one output of the ANN processor, a level of activity around a vehicle;
wherein evaluating the context of operation is based on the level of activity.

7. A method comprising:
collecting sensor data generated by a plurality of sensing devices of a vehicle, wherein the sensing devices include at least one camera, and wherein the sensor data is processed by one or more processing devices of the vehicle to provide a result, the processing devices control at least one function of the vehicle based on the result, and the processing devices include at least one artificial neural network (ANN) processor;
evaluating, by the ANN processor based on the sensor data, a context of operation of the vehicle, including determining an amount of energy available from a power supply, and determining at least one weather condition based on image data from the at least one camera; and
based on evaluating the context of operation:
adjust at least one operating characteristic for the sensing devices to reduce power consumption by the vehicle, including reducing a number of the sensing devices that are in an active state; and
adjust a processing capability for the at least one ANN processor.

8. The method of claim 7, wherein adjusting the at least one operating characteristic further includes changing a state of a first sensing device from an active state to an inactive state.

9. The method of claim 7, wherein adjusting the at least one operating characteristic for the processing devices comprises reducing a processing power of a first processing device.

10. The method of claim 9, wherein reducing the processing power of the first processing device comprises at least one of reducing a clock frequency or reducing a number of active cores.

11. The method of claim 7, wherein the vehicle further includes at least one memory device, the method further comprising adjusting, based on evaluating the context of operation, at least one operating characteristic of the at least one memory device.

12. The method of claim 7, further comprising receiving a GPS location of the vehicle, wherein evaluating the context of operation further includes evaluating based on an output from an artificial neural network (ANN) having the GPS location as an input.

13. The method of claim 7, further comprising receiving a communication including first data regarding a traffic infrastructure, wherein evaluating the context of operation further includes evaluating based on an output from an artificial neural network (ANN) having the first data as an input.

14. The method of claim 7, wherein evaluating the context of operation further includes determining a location of the vehicle.

15. A non-transitory computer-readable medium storing instructions which, when executed on a computing device, cause the computing device to:
- collect sensor data generated by a plurality of sensing devices of a vehicle, wherein the sensing devices include at least one camera, and wherein the sensor data is processed by one or more processing devices of the vehicle to provide a result, the processing devices control at least one function of the vehicle based on the result, and the processing devices include at least one artificial neural network (ANN) processor;
- evaluate, by the ANN processor based on the sensor data, a context of operation of the vehicle, wherein evaluating the context of operation comprises evaluating based on an output from an artificial neural network (ANN) having the sensor data as an input, wherein the output includes at least one type of object detected, and wherein the evaluating further comprises determining an amount of energy available from a power supply, and determining at least one weather condition based on image data from the at least one camera; and
- based on evaluating the context of operation:
  - adjust at least one operating characteristic for the sensing devices to reduce power consumption by the vehicle, including selecting at least a portion of the sensing devices to change to an inactive state based on the type of object detected; and
  - adjust a processing capability for the at least one ANN processor.

16. The non-transitory computer-readable medium of claim 15, wherein the at least one type of object includes at least one of a traffic object, an infrastructure traffic constraint, a path structure, or a road structure.

17. The non-transitory computer-readable medium of claim 15, wherein the instructions further cause the computing device to:
- receive one or more communications on a wireless interface of the vehicle, wherein the communications comprise at least one of cellular or vehicle-to-everything (V2X) communication;
- wherein evaluating the context of operation is further based on the received communications.

* * * * *